United States Patent [19]

Cefarelli et al.

[11] 4,312,564
[45] Jan. 26, 1982

[54] MULTI-FIBER OPTIC CONNECTOR

[75] Inventors: Frank P. Cefarelli; Robert T. Evans, both of Poughkeepsie, N.Y.

[73] Assignee: International Business Machines Corp., Armonk, N.Y.

[21] Appl. No.: 862,077

[22] Filed: Dec. 19, 1977

[51] Int. Cl.³ .............................................. G02B 7/26
[52] U.S. Cl. ................................................ 350/96.22
[58] Field of Search ................ 350/96.21, 96.20, 96.22

[56] References Cited

U.S. PATENT DOCUMENTS

| | | | |
|---|---|---|---|
| 3,947,182 | 3/1976 | McCartney et al. | 350/96.22 |
| 3,999,837 | 12/1976 | Bowen et al. | 350/96.22 |
| 4,056,305 | 11/1977 | McCartney et al. | 350/96.21 |

*Primary Examiner*—John D. Lee
*Attorney, Agent, or Firm*—Douglas R. McKechnie

[57] ABSTRACT

A multi-fiber optic connector is provided having a plurality of receptacles in a first housing each of which carries a single fiber optic centered therein. Each receptacle includes a smaller diameter guidance means. The second housing includes a like plurality of flexible male members having a single fiber optic centered therein, one opposite each of said receptacles. Each flexible male member has a tapered surface area located to cooperate with the smaller diameter guidance means in said receptacle to guide and bend the flexible male member to center it within said receptacle so that the fiber centered in said receptacle and the fiber centered in said male member meet coaxially in a plane vertical to the axes when the housings are mated.

The fibers are held in the receptacle and in the flexible male member by a three beam configuration which is made of resilient material so that different size fibers will be held concentrically.

5 Claims, 5 Drawing Figures

FIG. 1
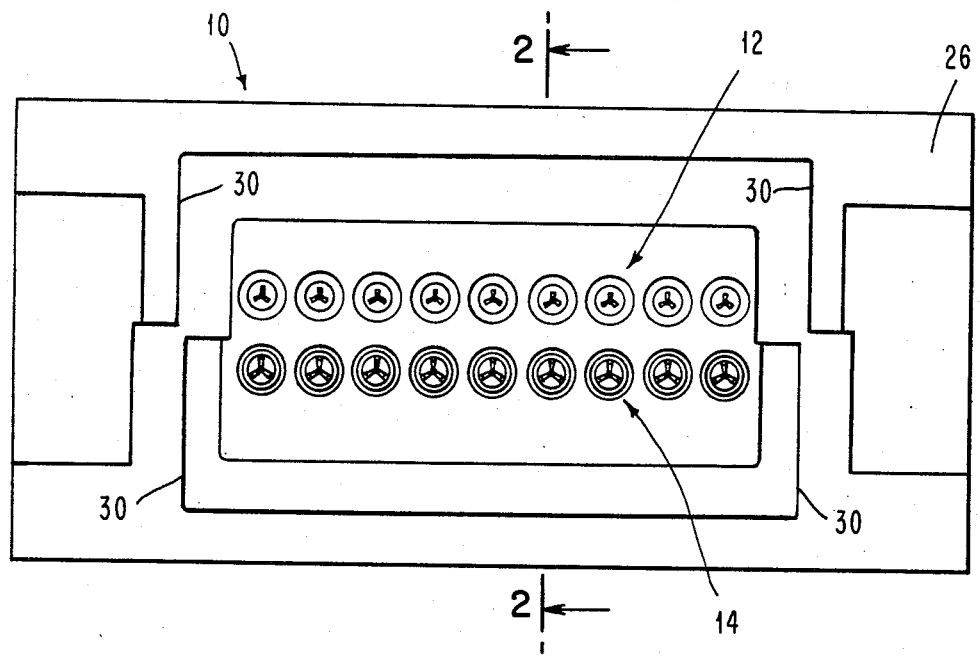
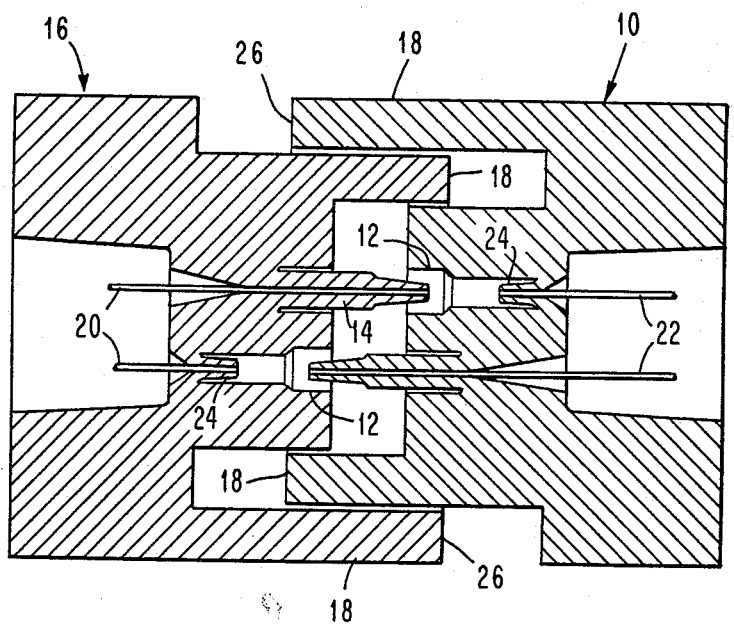
FIG. 2

DISPLACEMENT DUE TO BENDING

MULTI-FIBER OPTIC CONNECTOR

BACKGROUND OF THE INVENTION

The present invention relates to fiber optic connectors and, more particularly, to a multi-fiber optic connector in which individual fibers are connected with low light loss simultaneously with the mating of two connector housing halves.

DESCRIPTION OF THE PRIOR ART

The advance of fiber optic technology into the practical application realm requires, among other items, a reproducible component set of hardware capable of fulfilling total systems requirements. One of the items required is a multi-position connector which can connect a plurality of individual fibers repeatably with a low loss characteristic over its intended life, for example, 50 to 500 insertions and withdrawals. It is well known that there are considerable light losses in a fiber because of axial offset of interconnected fibers as well as an angularity offset, that is, the fiber ends do not meet in a plane vertical to the axis thereof. Another loss is due to the gap between the end faces of the interconnected fibers. These problems are further aggravated in a multifiber connector where the mating parts are not perfectly positioned but are slightly axially offset because of the machining or molding tolerances involved in the manufacture thereof.

U.S. Pat. No. 4,008,948 deals with a connector for multiple pairs of fibers, a plurality of tubular members are provided in one subassembly and a plurality of connector elements in the other subassembly. The tubular members are resiliently positioned axially to permit axial movement on assembly to allow for manufacturing tolerances. However, the possible axial offset or misalignment of fibers within the connector housing halves due to manufacturing tolerances is not dealt with.

SUMMARY OF THE INVENTION

It is the main object of the present invention to provide a multi-connector for a plurality of fiber optic pairs in which the fibers are axially abutting in the same vertical plane regardless of the offsets due to manufacturing tolerances.

It is another object of the present invention to provide a multi-fiber optic connector having a plurality of resilient beam members for holding the fiber adjacent the end thereof so that various diameter fibers can be accommodated.

It is a further object of the present invention to provide a multi-fiber optic connector in which each housing half is hermaphroditic and contains guiding surfaces for the mating of the housing halves when they are rotated 180° from one another.

Briefly, the invention consists of a multi-fiber optic connector having a first and second housing, each having guiding means for mating with one another when the housings are interconnected. A plurality of receptacles are located in the first housing each carrying a single fiber optic centered therein and each having a smaller diameter guidance means located therein. A first and second diameter section is formed within the receptacle, the larger diameter section extending into the receptacle from the mouth thereof and the smaller diameter section extending from near the end of the larger diameter section to the bottom of said receptacle. A backward facing forward sloped shoulder connects the larger diameter section and the smaller diameter section within each receptacle. The edge between the shoulder and the smaller diameter section forms the smaller diameter guidance means. A like plurality of flexible male members extend from the second housing, one opposite each of said receptacles. A larger and smaller diameter section are located along said male member, the larger diameter section extending from the second housing to a shoulder and the smaller diameter section tapering from the shoulder to the end of the male member. The shoulder faces forward with a backward slope and connects the larger diameter section to the smaller diameter section, the smaller diameter guidance means in said receptacle and the shoulder on the male member cooperate to guide and bend the flexible male member to center it within the receptacle so that the fiber centered in the receptacle and the fiber centered in the male member meet co-axially in a vertical plane.

The smaller diameter section is formed of a plurality of resilient beam members adapted to hold the fiber adjacent the end thereof so that different size fibers can be held concentrically.

FIG. 1 is an enlarged schematic face view of a hermaphroditic multi-fiber optic connector showing the row of receptacles and the row of flexible male members.

FIG. 2 is a sectional view along the lines 2—2 of FIG. 1 which is shown partially mated with a like housing member.

DESCRIPTION OF THE PREFERRED EMBODIMENT

Figure 3:
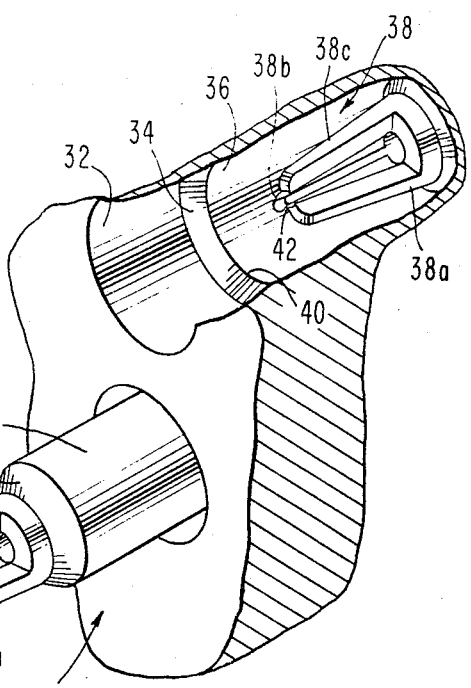
FIG. 3 is a blown up schematic view of a section of the connector showing one of the receptacles and the adjacent male member.

The multi-position optical fiber connector requires the interconnecting of a plurality of pairs of fibers with relatively low light losses and with connections which can be broken and remade many times while still maintaining their low loss characteristics. FIG. 1 shows a housing half 10 which contains a row of receptacles 12 and a row of flexible male members 14, each of which is directly beneath one of the receptacles. The housing half itself is hermaphroditic and it is machined or molded such that when rotated 180° a second housing half 16 can be mated therewith. The housing half 10 has a relatively loose fit with the other housing half 16 to give a rough fit of the male members 14 of the one housing half with the receptacles 12 of the other housing half. FIG. 2 shows a cross-sectional view of the housing half 10 of FIG. 1 partially mated with a 180° rotated housing half 16 showing the rough fit of the keying members 18 of the housing halves with one another to provide the rough positioning of the male members 14 within the opposite receptacles 12. The glass fiber 20 to be connected to the opposing glass fiber 22 in abutting relationship is shown in position in FIG. 2. The fiber is inserted through the rear of the housing member and advanced to the end of the male member 14 in one case, and is inserted into the rear of the housing into a holding element 24 at the bottom of the receptacle 12 in the other case. Preferably, the length of the fiber 20, 22 which is to be included within the connector has the outer protective coating removed therefrom. Thus, the fiber 20, 22 within the connector consists of the glass or plastic fiber itself with its cladding still on. The connector halves 10, 16 can be adapted to fibers with the outer sheath remaining on. However, the outer sheathing is not put on in a controlled manner and, thus, the concentricity may be lost causing light losses in the connection. The protective key surfaces 26 are shown in FIGS. 1 and 2 where FIG. 2 is a sectional view of FIG. 1 along the line 2—2 with an additional housing half partially connected thereto. The horizontal surfaces of the key 18 of one housing half 10 meet the horizontal surfaces of the opposing opening in the other housing half 16 to establish the vertical alignment of the male members 14 with respect to the opposing receptacles 12. Similarly, the vertical key surfaces 30 of one housing half (see FIG. 1) meet the vertical key surfaces of the opposing housing half when mated to determine the horizontal location of the male members 14 with respect to the opposing receptacles 12.

An enlargement of one of the receptacles 12 shown in FIG. 1 is depicted in isometric form in FIG. 3. The wider diameter portion 32 of the receptacle 12 which extends from the opening to the backward facing shoulder 34 is shown. If the male member 14 and the receptacle 12 happen to be exactly aligned the male member would extend down the middle of this wider diameter portion 32. However, since the manufacturing tolerances often result in the male member 12 being offset somewhat from the exact center of the larger diameter portion 32, the walls of the larger diameter portion 32 act as a guidance means for the male member. A smaller diameter portion 36 extends from the backward facing shoulder 34 to the bottom of the receptacle. The backward facing shoulder 34 has a considerable slope or taper from the larger diameter portion 32 to the smaller diameter portion 36. A three beam holding member 38 is located in the center of the smaller diameter portion 36 extending from the bottom of the receptacle 12. It is critical that the longitudinal center axis of the three beam member 38 coincide with the central axis of the smaller diameter portion 36 of the receptacle which includes the bottom edge 40 of the backward facing shoulder 34 which forms the critical guidance edge within the receptacle for the male member. Also, the distance from the top of the three beam member 38 located within the receptacle to the bottom edge 40 of the shoulder or critical guidance edge must be substantially fixed so that the male member 14 when inserted within the receptacle 12 will abut the fiber 22 held by the three beam member 38 with the end of the fiber 20 held by the end of the male member. Of course, because of molding and machining tolerances some small gap between the abutting fiber ends may exist. It should be noted that the three beam member 38 within the receptacle 12 is made of a resilient material such that the end opening 42 between the 120° displaced beams 38a, 38b and 38c can accommodate various diameter fibers. The initial design is such that the opening 42 within the three beam member 38 is designed to hold the smallest diameter fiber to be used adjacent the end thereof so that the end of the fiber is available for abutting with a fiber end to be connected thereto.

A blown up view of the male member 14 is also shown in FIG. 3. The male member 14 consists of a larger diameter shaft or beam 44 which extends from within the housing to a forward facing shoulder 46.

As can be seen best in FIG. 2 the male member 14 is recessed or appears to be protruding from a well. This gives the necessary length of this diameter portion 44 of the beam or male member needed to obtain the necessary flexing for a flat abutting of the fiber ends to be connected as will be subsequently discussed in more detail.

Figure 4:
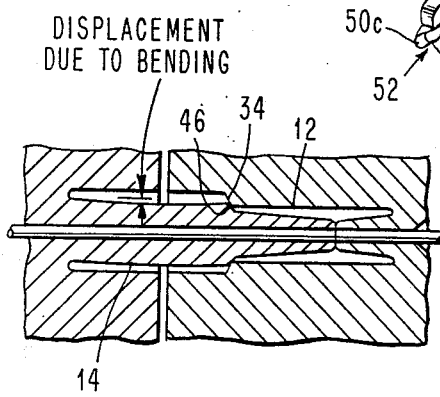
FIG. 4 is a schematic representation showing the cooperation between the flexible male member and the receptacle to provide the required positioning.
Figure 5:
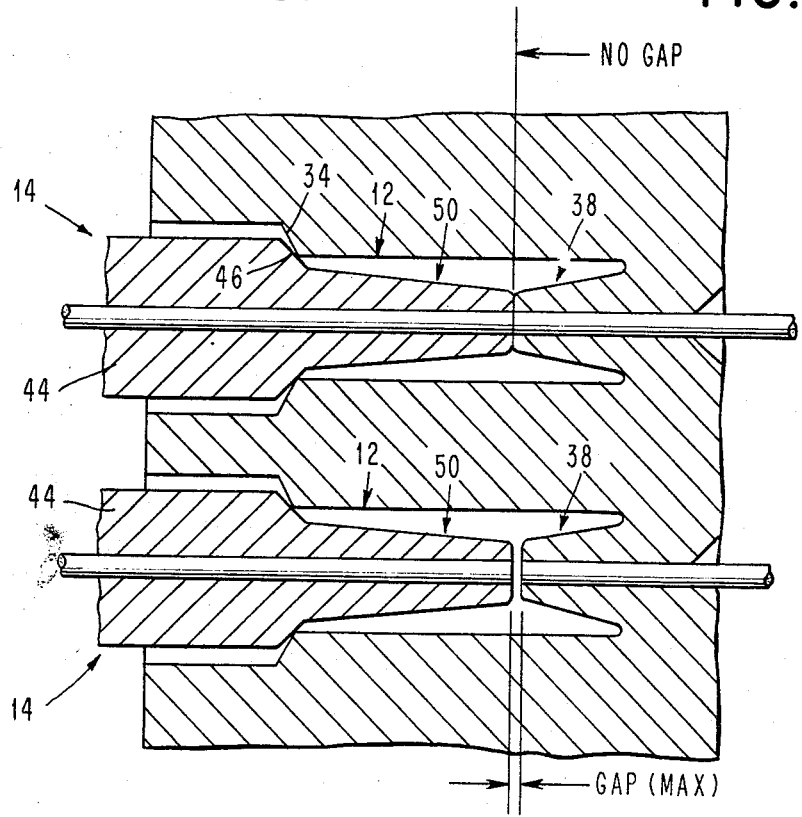
FIG. 5 is a further schematic representation showing two male members seated in their receptacles with a minimum and maximum gap between abutting fibers, respectively.

The shoulder 46 is tapered forward and connects the outer larger diameter portion 44 of the male member 14 to a smaller diameter three beam member 50. As in the case of the three beam member within the receptacle the three beams 50a, 50b and 50c are located at 120° with respect to one another and form a holding member for a fiber centered therein. The three beam member 50 holds the fiber adjacent the end thereof as can be seen best in FIG. 2. The three beam member 50 is made of a resilient material and tapers down near the end thereof to a central opening 52 which is of a sufficiently small diameter to hold the smallest diameter fiber to be used. The resiliency of each of the three beams 50a, 50b and 50c provides for the holding of a larger diameter fiber. It should be noted that the backward slope of the forward facing shoulder 46 on the male member 14 is not as steep as the slope of the backward facing shoulder 34 on the receptacle. Thus, when the male member 14 is guided into the opposite receptacle 12, the shoulder 46 of the male member 14 is contacted by the critical guidance edge 40 of the smaller diameter portion 36 of the receptacle 12, thereby acting as a stop for the male member 14 as well as providing a centering effect. FIG. 4 is an exaggerated illustration showing the flexible male member 14 making a fiber-to-fiber connection wherein the male member is considerably bent as a result of the centering action caused by the coaction of the respective male member shoulder 14 and critical guidance edge 40. It appears that the centering action of the respective male member shoulder and critical guidance edge of the receptacle causes the bending of the male member along the larger diameter beam portion 44 to compensate for any axial offset in alignment between the male member 14 and receptacle 12 caused by manufacturing tolerances. Otherwise, the end surfaces of the fibers held by the respective male member 14 and receptacle 12 would be axially offset and would not abut in a plane vertical to the axis. It should be appreciated, that the diameter of the wider portion 32 of the receptacle 12 is larger than the diameter of the wider portion 44 of the male member 14 so that the male member can bend therein along its longitudinal axis. It has been found that the cooperation of the central guidance edge 40 of the receptacle 12 and the sloped shoulder 46 of the male member 14 produces a coaxial abutting connection between the fibers held in the respective members. However, as illustrated in FIG. 5, the machining and molding tolerances have been found to result in a possible gap between the fiber ends. This gap may extend from a minimum of no gap to a 0.002" maximum gap. The 0.002" maximum gap produces approximately a 1.8 db loss. This indicates that the length of the three beam member 50 of the male member 14 and the length of the three beam member 38 of the receptacles is just as critical as the distance from the critical edge 40 of the smaller diameter section 36 to the top of the three beam member 38 in the receptacle.

It will be appreciated that the housing halves do not necessarily have to be hermaphroditic. The one housing can contain the receptacles and the other housing can contain the opposite located male members. The important thing is that the housings contain guidance and locating surfaces to give the rough mating of the male members with the opposite receptacles. The rest of the description for the hermaphroditic connector applies as well to the non-hermaphroditic type mentioned here.

While the invention has been particularly shown and described with reference to a preferred embodiment thereof, those skilled in the art will recognize that the above and other changes in form and details may be made therein without departing from the spirit and scope of the invention.

What is claimed is:

1. A multi-fiber optic connector comprising:
   a first and a second housing;
   guiding means on said first and said second housing for mating with one another when said housings are interconnected;
   a plurality of receptacles in said first housing each carrying a single fiber optic centered therein;
   said receptacles each having at least three beam members equally spaced from one another and located centrally therein for holding the optical fiber adjacent the end thereof in a central position with the end of the fiber facing the top of the receptacle and parallel thereto;
   a smaller diameter guidance means located within each of said receptacles;
   a like plurality of flexible male members, each carrying a single fiber optic centered therein, extending from said second housing, one opposite each of said receptacles;
   a tapered surface area on said male member adapted to cooperate with said smaller diameter guidance means in said receptacle to guide and bend said flexible male member to center it within said receptacle so that the fiber centered in said receptacle and the fiber centered in said male member abut coaxially with the ends lying in the same vertical plane.

2. A multi-fiber optic connector according to claim 1, wherein each of said beam members is equally spaced from the other about the circumference of a circle and is urged inward at the holding end sufficiently to hold the smallest diameter optical fiber.

3. A multi-fiber optic connector according to claim 2, wherein each of said beam members is made sufficiently resilient to bend enough to hold larger diameter optical fibers centered in said opening.

4. A multi-fiber optic connector according to claim 1, wherein each of said beam members is equally spaced from the other about the circumference of a circle and is urged inward towards the holding end sufficiently to hold the smallest diameter optical fiber.

5. A multi-fiber optic connector according to claim 4, wherein each of said beam members is made sufficiently resilient to bend enough to hold larger diameter optical fibers centered in said male member.

* * * * *